United States Patent
Terashima et al.

(10) Patent No.: US 12,039,799 B2
(45) Date of Patent: Jul. 16, 2024

(54) PART DETECTION APPARATUS, PART DETECTION METHOD, AND COMPUTER-READABLE RECORDING MEDIUM

(71) Applicant: NEC Solution Innovators, Ltd., Tokyo (JP)

(72) Inventors: Hiroki Terashima, Tokyo (JP); Katsuyuki Nagai, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 378 days.

(21) Appl. No.: 17/442,829

(22) PCT Filed: Feb. 12, 2020

(86) PCT No.: PCT/JP2020/005350
§ 371 (c)(1),
(2) Date: Sep. 24, 2021

(87) PCT Pub. No.: WO2020/195272
PCT Pub. Date: Oct. 1, 2020

(65) Prior Publication Data
US 2022/0180652 A1  Jun. 9, 2022

(30) Foreign Application Priority Data

Mar. 28, 2019  (JP) .................. 2019-064753

(51) Int. Cl.
*G06K 9/00* (2022.01)
*G06V 10/46* (2022.01)
*G06V 40/10* (2022.01)

(52) U.S. Cl.
CPC .............. *G06V 40/10* (2022.01); *G06V 10/46* (2022.01)

(58) Field of Classification Search
CPC ................................ G06V 40/10; G06V 10/46
See application file for complete search history.

(56) References Cited

U.S. PATENT DOCUMENTS

| 5,987,154 A | * | 11/1999 | Gibbon | .................... H04N 7/15 |
| | | | | 382/199 |
| 2013/0236108 A1 | * | 9/2013 | Matsuda | ................ G06V 10/46 |
| | | | | 382/203 |

FOREIGN PATENT DOCUMENTS

| JP | 2001-094829 A | 4/2001 |
| JP | 2003-256850 A | 9/2003 |
| JP | 2016-123590 A | 7/2016 |

(Continued)

OTHER PUBLICATIONS

English translation of Written opinion for PCT Application No. PCT/JP2020/005350, mailed on Apr. 7, 2020.

(Continued)

*Primary Examiner* — Avinash Yentrapati
(74) *Attorney, Agent, or Firm* — Sughrue Mion, PLLC

(57) ABSTRACT

A part detection apparatus (10) including: a data acquisition unit (11) that acquires image data of a human to be subject, a contour extraction unit (12) that extracts an outline representing a contour of the human to be subject, from the acquired image data, and a part detection unit (13) that continuously calculates a curvature radius on the extracted outline and detecting a part of a body of the human to be subject based on a change in the calculated curvature radius.

9 Claims, 7 Drawing Sheets

(56) References Cited

FOREIGN PATENT DOCUMENTS

WO      2012-090645 A1    7/2012
WO      2019/047492 A1    3/2019

OTHER PUBLICATIONS

International Search Report for PCT Application No. PCT/JP2020/005350, mailed on Apr. 7, 2020.
Jamie Shotton et al., "Real-Time Human Pose Recognition in Parts from Single Depth Images", Conference on Computer Vision and Pattern Recognition (CVPR) 2011, Colorado Springs, USA, Jun. 20-25, 2011, pp. 1297-1304.
CN Office Action for Chinese Patent Application No. 202080024023.X, mailed on Dec. 21, 2023 with English Translation.

\* cited by examiner

PART DETECTION APPARATUS, PART DETECTION METHOD, AND COMPUTER-READABLE RECORDING MEDIUM

This application is a National Stage Entry of PCT/JP2020/005350 filed on Feb. 12, 2020, which claims priority from Japanese Patent Application 2019-064753 filed on Mar. 28, 2019, the contents of all of which are incorporated herein by reference, in their entirety.

TECHNICAL FIELD

The present invention relates to a part detection apparatus and a part detection method for detecting a specific part of a human body, and further relates to a computer-readable recording medium on which a program for realizing these is recorded.

BACKGROUND ART

In recent years, attempts have been made to analyze the human movement using a depth sensor (see, for example, Non-Patent Documents 1 and 2). The depth sensor is an imaging apparatus capable of measuring a distance to a subject for each pixel. The image taken by the depth sensor is called a depth image. The depth image has distance (depth) information to the subject for each pixel. A typical depth sensor is a TOF (Time of Flight) camera.

Specifically, Non-Patent Document 1 discloses a system that detects a human movement in real time using the depth sensor. The system disclosed in Patent Document 1 acquires a depth image taken by the depth sensor, collates the depth image with a learning model to identify human joints in the depth image. Then, the system disclosed in Patent Document 1 analyzes the human movement based on the identified joints.

LIST OF RELATED ART DOCUMENTS

Non-Patent Document

[Non-Patent document 1] Jamie Shotton, Andrew W. Fitzgibbon, Mat Cook, Toby Sharp, Mark Finocchio, Richard Moore, Alex Kipman, and Andrew Blake, "Real-time human pose recognition in parts from single depth images", In CVPR, 2011.

SUMMARY OF INVENTION

Problems to be Solved by the Invention

However, when adopting the system disclosed in Non-Patent Document 1, it is necessary to construct the learning model for identifying joints in advance as described above. The construction of the learning model is performed by machine learning. In order to improve the accuracy of identifying joints, it is necessary to prepare a huge number of labeled depth images as training data. In addition, when a human movement to be analyzed is different, it is necessary to separately construct a learning model according to the human movement. Therefore, the system disclosed in Non-Patent Document 1 has a problem that the cost for constructing the system is high.

An example of an object of the present invention is to provide a part detection apparatus, a part detection method, and a computer-readable recording medium that can solve the above problems and enable identification of a part of a human body from an image without using machine learning.

To achieve the aforementioned example object, a part detection apparatus according to an example aspect of the present invention includes:

a data acquisition means for acquiring image data of a human to be subject, a contour extraction means for extracting an outline representing a contour of the human to be subject, from the acquired image data, and a part detection means for continuously calculating a curvature radius on the extracted outline and detecting a part of a body of the human to be subject based on a change in the calculated curvature radius.

Furthermore, to achieve the aforementioned example object, a part detection method according to an example aspect of the present invention includes:

acquiring image data of a human to be subject, extracting an outline representing a contour of the human to be subject, from the acquired image data, and continuously calculating a curvature radius on the extracted outline and detecting a part of a body of the human to be subject based on a change in the calculated curvature radius.

Moreover, to achieve the aforementioned example object, a computer-readable recording medium according to an example aspect of the present invention has recorded therein a program including an instruction that causes a computer to execute:

acquiring image data of a human to be subject, extracting an outline representing a contour of the human to be subject, from the acquired image data, and continuously calculating a curvature radius on the extracted outline and detecting a part of a body of the human to be subject based on a change in the calculated curvature radius.

Advantageous Effects of the Invention

As described above, according to the present invention, it is possible to identify a part of a human body from an image without using machine learning.

EXAMPLE EMBODIMENT

Example Embodiment

The following describes a part detection apparatus, a part detection method, and a program according to an example embodiment with reference to FIG. 1 to FIG. 7.

[Apparatus Configuration]

Figure 1:
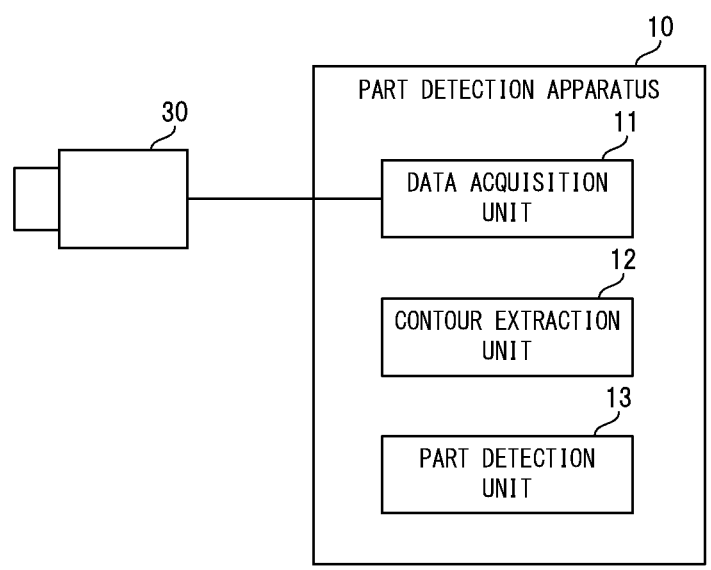
FIG. 1 is a block diagram showing a configuration of a part detection apparatus according to an example embodiment.

First, a configuration of the part detection apparatus according to the present example embodiment will be described using FIG. 1. FIG. 1 is a block diagram showing a configuration of a part detection apparatus according to an example embodiment.

The part detection apparatus 10 according to the present example embodiment shown in FIG. 1 is an apparatus for detecting a part of a human body from an image. As shown in FIG. 1, the part detection apparatus 10 includes a data acquisition unit 11, a contour extraction unit 12, and a part detection unit 13.

The data acquisition unit 11 acquires image data of the image of the human to be analyzed. The contour extraction unit 12 extracts an outline representing a contour of the human to be subject from the image data acquired by the data acquisition unit 11. The part detection unit 13 continuously calculates a curvature radius on the outline extracted by the contour extraction unit 12. Then, the part detection unit 13 detects the part of the body of the human to be subject based on a change in the calculated curvature radius.

As described above, in the example embodiment, the part of the human to be subject can be detected from the image without using the learning model. As a result, it is possible to significantly reduce a cost in constructing a system for analyzing movements of the human body.

Subsequently, the configuration and function of the part detection apparatus will be specifically described with reference to FIGS. 2 to 5 in addition to FIG. 1. First, as shown in FIG. 1, in the example embodiment, the part detection apparatus 10 is connected to the imaging device 30.

The imaging device 30 may be any device capable of imaging the subject and outputting the image data of the subject. Examples of the image pickup device 30 include a digital camera. Further, the imaging device 30 may be a device capable of measuring a distance to the subject for each pixel, for example, a TOF camera. The TOF camera irradiates the subject with light such as near-infrared light, measures a time until the irradiated light is reflected by the subject and returns, and measures the distance to the subject for each pixel. The TOF camera outputs a data for specifying the measured distance for each pixel. When the imaging device 30 is the TOF camera, three-dimensional point cloud data is output as the image data.

Figure 2:
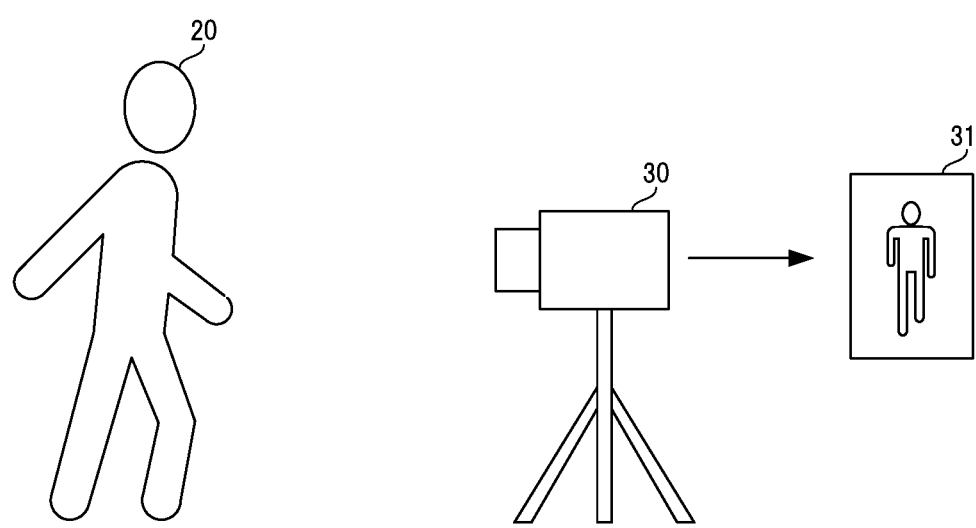
FIG. 2 is a diagram showing a positional relationship between an imaging device used in the example embodiment and a human to be analyzed.
Figure 3:
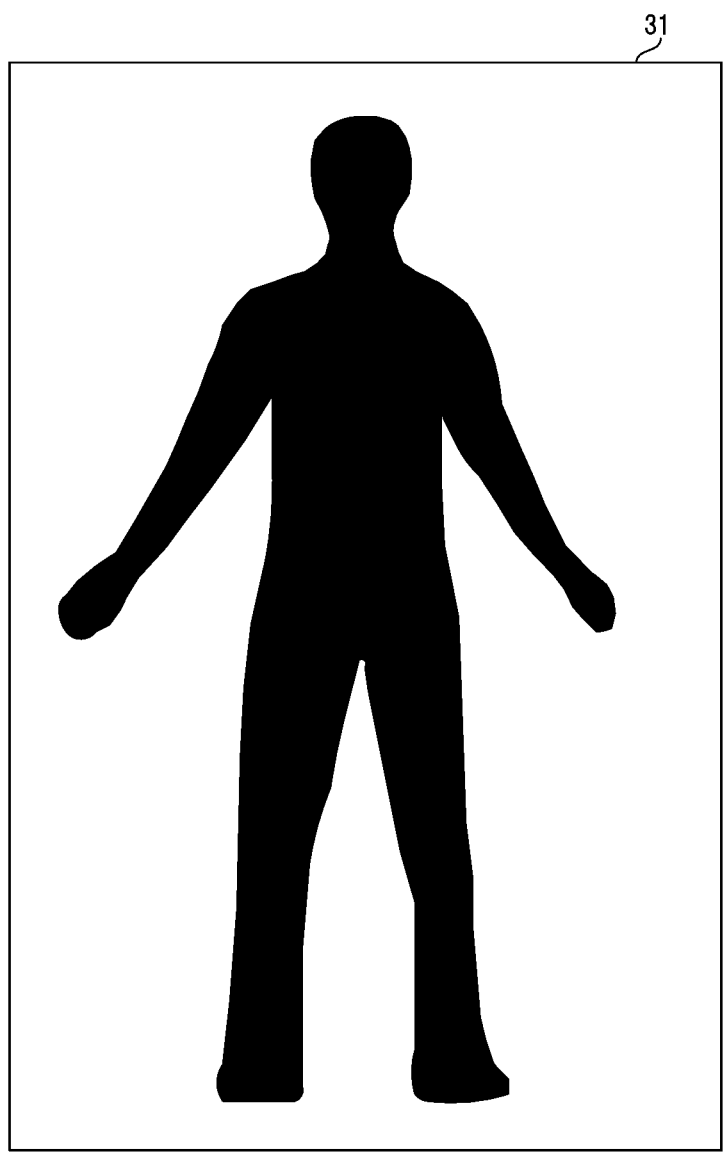
FIG. 3 is a diagram showing an example of image data output from the imaging device in the example embodiment.

FIG. 2 is a diagram showing a positional relationship between the imaging device used in the example embodiment and the human to be subject. FIG. 3 is a diagram showing an example of image data output from the imaging device in the example embodiment. As shown in FIG. 2, in the example embodiment, the imaging device 30 is arranged so that a front surface of the human to be subject 20 is imaged. In this case, the imaging device 30 outputs, for example, the image data 31 shown in FIG. 3. In FIG. 3, only the silhouette of the human to be subject is shown for the sake of explanation.

Figure 4:
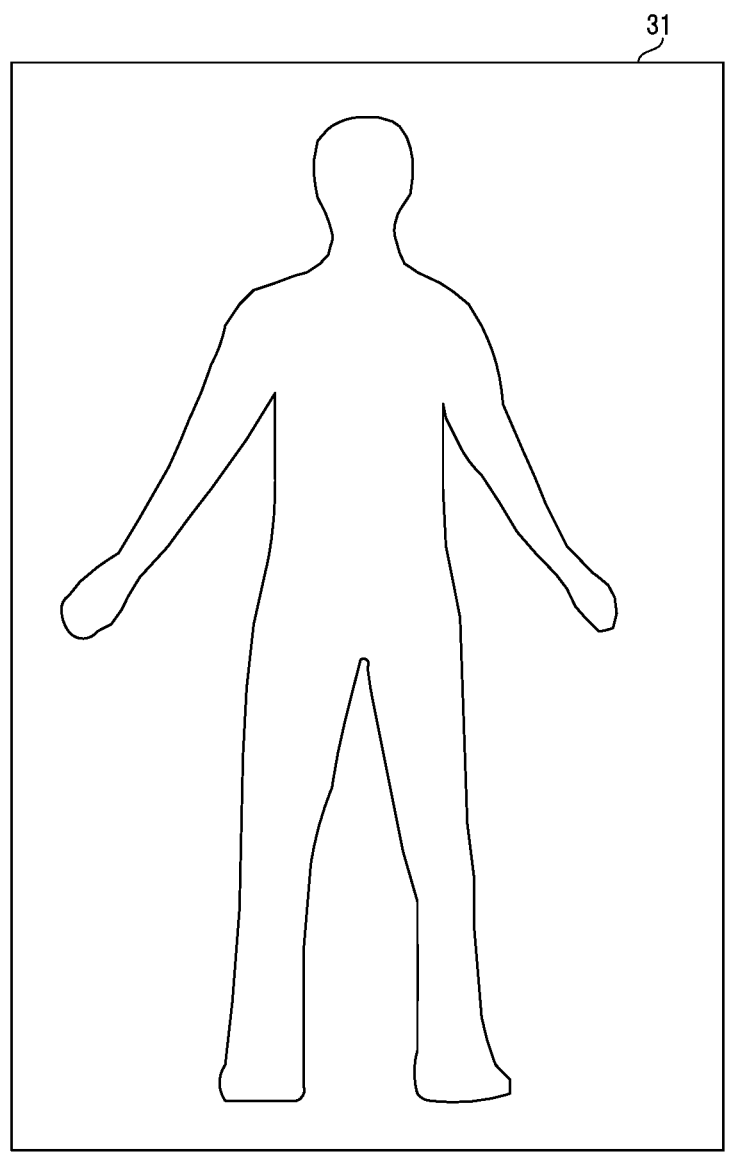
FIG. 4 is a diagram showing an example of a contour of the human to be analyzed extracted from the image data in the example embodiment.
Figure 5:
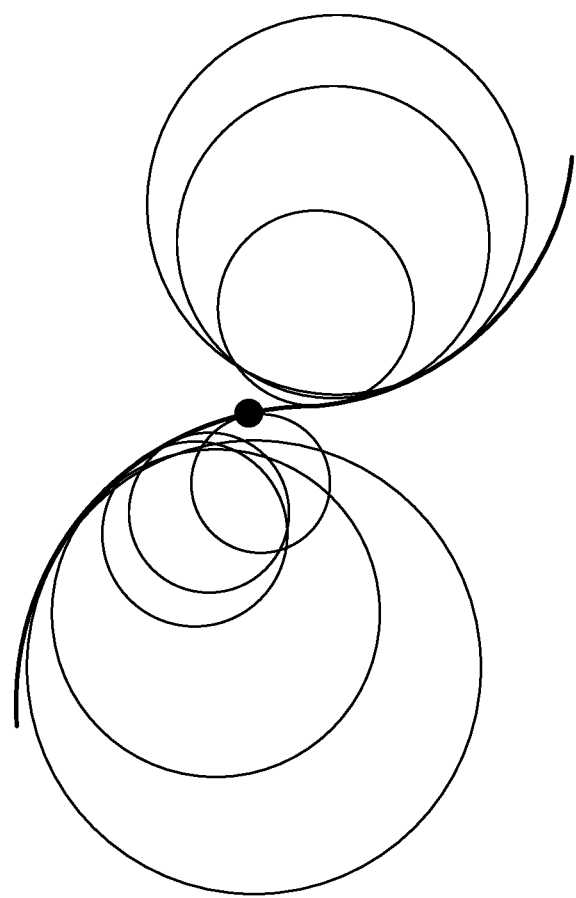
FIG. 5 is a diagram showing a process performed by a part detection unit in the example embodiment.

FIG. 4 is a diagram showing an example of the contour of the human to be subject extracted from the image data in the example embodiment. FIG. 5 is a diagram showing a process performed by the part detection apparatus in the example embodiment. As shown in FIG. 4, the contour extraction unit 12 extracts the outline of the human to be subject 20 from the image data. The example of FIG. 4 shows the outline extracted from the image shown in FIG. 3. Further, as the outline extraction method, an existing method, for example, a method of detecting a portion where the density change is steep by the first derivative is used.

In the present example embodiment, the part detection unit 13 first continuously calculates the curvature radius on the outline of the contour extracted by the contour extraction unit 12, as shown in FIG. 5. In the example of FIG. 5, each curvature radius calculated in a contour of a shoulder of the human to be subject 20 is represented by a circle having the curvature radius.

Specifically, it is assumed that the outline in the portion where the curvature radius is obtained is represented by "y=f (x)", and coordinates of a contact point between the outline and a circle indicating the curvature radius are (a, f (a)). In this case, the part detection unit 13 calculates the curvature radius R in (a, f (a)) by the following formula 1. In the example embodiment, the method for calculating the curvature radius R is not particularly limited, and the curvature radius R may be calculated using another formula.

$$R = \frac{\left(1 + f'(a)^2\right)^{\frac{3}{2}}}{|f''(a)|} \qquad \text{[Formula 1]}$$

Subsequently, the part detection unit 13 identifies a point on the outline where a change in curvature radius changes from decrease to increase and detects the identified point as a part of the human to be subject 20. Further, the identified portion may be a center of the portion of the human to be subject 20 or an end portion (or convex portion) of the portion of the human to be subject 20. In the example of FIG. 5, the center of one shoulder is identified. The center of the identified shoulder is indicated by "black circle". In addition, the part detection unit 13 can also detect coordinates (a horizontal coordinate, a vertical coordinate) of the identified point on the image.

Further, as shown in FIG. 4, when the outline of the entire body in front of the human to be subject 20 is extracted, the part detection unit 13 detects not only the shoulder but also a head, a neck, a hand, a toe, a crotch, and an armpit. etc. Further, in the image acquired by the data acquisition unit 11, when the human to be subject 20 bends joints such as knees and elbows, the part detection unit 13 can also identify these joints.

[Apparatus Operations]

Figure 6:
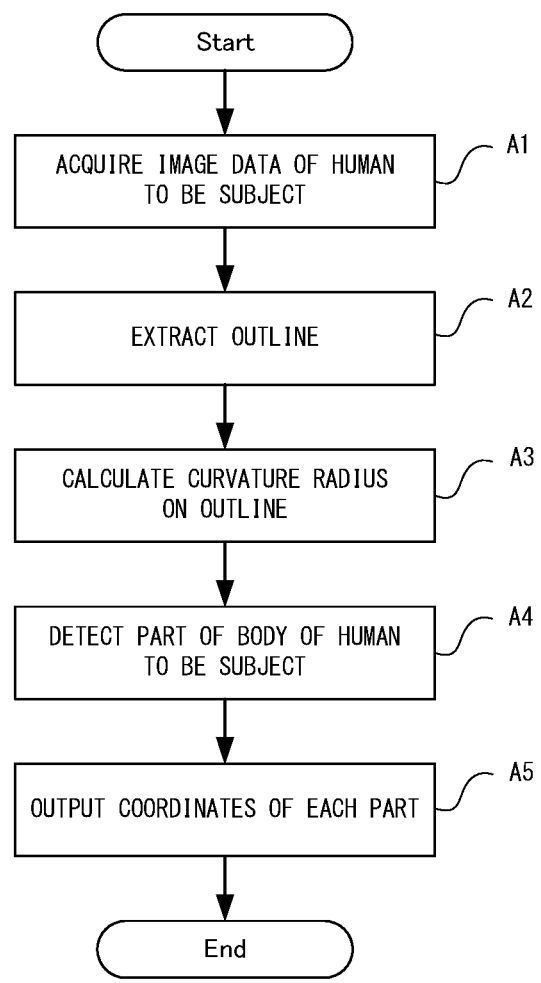
FIG. 6 is a flow diagram showing the operation of the part detection apparatus according to the example embodiment.

Next, the operations of the part detection apparatus 10 according to the present example embodiment will be described using FIG. 6. FIG. 6 is a flow diagram showing the operation of the part detection apparatus according to the example embodiment. In the following description, FIG. 1 to FIG. 5 will be referred to as appropriate. Furthermore, in the present example embodiment, the part detection method is carried out by causing the part detection apparatus 10 to operate. Therefore, the following description of the operations of the part detection 10 applies to the part detection method according to the example embodiment.

As shown in FIG. 6, first, in the part detection apparatus 10, the data acquisition unit 11 acquires the image data of the human to be subject 20 from the imaging device 30 (step A1).

Next, the contour extraction unit 12 extracts the outline representing the contour of the human to be subject 20 from the image data acquired in step A1 (step A2).

Next, the part detection unit 13 continuously calculates the curvature radius on the outline extracted in step A2 (step A3). Next, the part detection unit 13 detects a part of the body of the human to be subject based on a change in the curvature radius calculated in step A3 (step A4).

Specifically, in step A4, the part detection unit 13 identifies a point on the outline where the change in curvature radius changes from decrease to increase and detects coordinates of the identified point as coordinates of a central portion of the part. When the outline extracted in step A2 is the outline of the entire body in front of the human to be subject 20 shown in FIG. 4, the part detection unit 13 detects a head, a neck, a shoulder, a hand, a toe, a crotch and an armpit etc.

After that, the part detection unit 13 outputs the coordinates of each identified part to an external device (step A5). Examples of the external device include a device that uses the coordinates of the part, for example, a device that analyzes a movement of a human, a game device, and the like.

Effect in Example Embodiment

As described above, in the example embodiment, it is possible to identify the part of the human to be subject 20 from the contour obtained from the image data of the human to be subject 20. According to this example embodiment, it is possible to identify the part of the human body from an image without using machine learning.

Modification Example

In the example embodiment, when the imaging device 30 continuously outputs an image data at set intervals, the part detection apparatus 10 can detect the part of the human to be subject according to each output image data at set intervals. In this case, the part detection apparatus 10 outputs coordinates of the part to the external device in the identified order, that is, in the time series. As a result, for example, assuming that the external device is an analyzer for the walking motion of the human to be subject 20, the analyzer can identify a time-series changes in coordinates of each part in the horizontal and vertical directions. The analyzer determines whether the human to be subject 20 can walk straight.

[Program]

It is sufficient for the program according to the example embodiment to be a program that causes a computer to execute steps A1 to A5 shown in FIG. 6. The part detection apparatus and the part detection method according to the example embodiment can be realized by installing this program in the computer and executing this program. In this case, a processor of the computer functions as the data acquisition unit 11, the contour extraction unit 12, and the part detection unit 13, and performs processing.

Furthermore, the program according to the example embodiment may be executed by a computer system constructed with a plurality of computers. In this case, for example, each computer may function as one of the data acquisition unit 11, the contour extraction unit 12, and the part detection unit 13.

Figure 7:
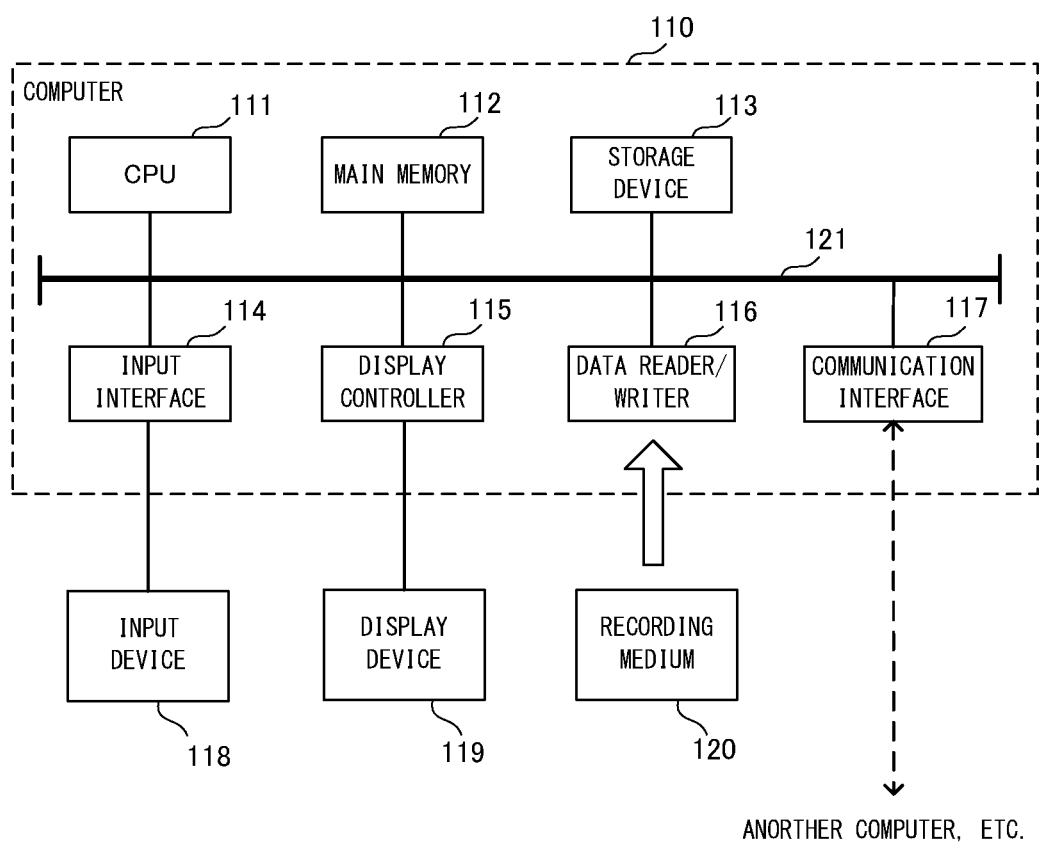
FIG. 7 is a block diagram showing an example of a computer that realizes the part detection apparatus according to the example embodiment.

Here, using FIG. 7, the following describes a computer that realizes the part detection apparatus 10 by executing the program according to the example embodiment. FIG. 7 is a block diagram showing an example of a computer that realizes the part detection apparatus according to the example embodiment.

As shown in FIG. 7, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111, or in place of the CPU 111.

The CPU 111 carries out various types of calculation by deploying the program (codes) according to the present example embodiment stored in the storage device 113 to the main memory 112 and executing the codes in a predetermined order. The main memory 112 is typically a volatile storage device, such as a DRAM (dynamic random-access memory). Also, the program according to the present example embodiment is provided in a state where it is stored in a computer-readable recording medium 120. Note that the program according to the present example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input apparatus 118, such as a keyboard and a mouse. The display controller 115 is connected to a display apparatus 119, and controls display on the display apparatus 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include a general-purpose semiconductor storage device such as CF (CompactFlash®) and SD (Secure Digital), a magnetic recording medium such as a flexible disk; and an optical recording medium such as a CD-ROM (Compact Disk Read Only Memory).

Note that the part detection apparatus 10 according to the example embodiment can also be realized by using items of hardware that respectively correspond to the components, rather than the computer in which the program is installed. Furthermore, a part of the part detection apparatus 10 may be realized by the program, and the remaining part of the part detection apparatus 10 may be realized by hardware.

A part or an entirety of the above-described example embodiment can be represented by (Supplementary Note 1) to (Supplementary Note 9) described below, but is not limited to the description below.

Supplementary Note 1

A part detection apparatus including:
a data acquisition unit that acquires image data of a human to be subject,
a contour extraction unit that extracts an outline representing a contour of the human to be subject, from the acquired image data, and
a part detection unit that continuously calculates a curvature radius on the extracted outline and detecting a part of a body of the human to be subject based on a change in the calculated curvature radius.

Supplementary Note 2

The part detection apparatus according to Supplementary Note 1, wherein
the part detection unit identifies a point on the outline where a change in curvature radius changes from decreasing to increasing and detects the identified point as a part of the part.

Supplementary Note 3

The part detection apparatus according to Supplementary Note 2, wherein
the part detection unit detects one of at least of a shoulder, a head, a neck, an elbow, and a knee, as the part.

Supplementary Note 4

A part detection method including:
a data acquisition step for acquiring image data of a human to be subject,
a contour extraction step for extracting an outline representing a contour of the human to be subject, from the acquired image data, and
a part detection step for continuously calculating a curvature radius on the extracted outline and detecting a part of a body of the human to be subject based on a change in the calculated curvature radius.

Supplementary Note 5

The part detection method according to Supplementary Note 4, wherein
in the part detection step, identifying a point on the outline where a change in curvature radius changes from decreasing to increasing and detecting the identified point as a part of the part.

Supplementary Note 6

The part detection method according to Supplementary Note 5, wherein
in the part detection step, detecting one of at least of a shoulder, a head, a neck, an elbow, and a knee, as the part.

Supplementary Note 7

A computer-readable recording medium that includes a program recorded thereon, the program including instructions that cause a computer to carry out,
a data acquisition step for acquiring image data of a human to be subject,
a contour extraction step for extracting an outline representing a contour of the human to be subject, from the acquired image data, and
a part detection step for continuously calculating a curvature radius on the extracted outline and detecting a part of a body of the human to be subject based on a change in the calculated curvature radius.

Supplementary Note 8

The computer-readable recording medium according to Supplementary Note 7, wherein
in the part detection step, identifying a point on the outline where a change in curvature radius changes from decreasing to increasing and detecting the identified point as a part of the part.

Supplementary Note 9

The computer-readable recording medium according to Supplementary Note 8, wherein
in the part detection step, detecting one of at least of a shoulder, a head, a neck, an elbow, and a knee, as the part.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

This application is based upon and claims the benefit of priority from Japanese application No. 2019-64753 filed on Mar. 28, 2019, the disclosure of which is incorporated herein in its entirety by reference.

INDUSTRIAL APPLICABILITY

As described above, according to the present invention, it is possible to identify a part of the human body from an image without using machine learning. The present invention is useful for various systems in which identification of each part of the human body is required.

REFERENCE SIGNS LIST 10 part detection apparatus
11 data acquisition unit
12 contour extraction unit
13 part detection unit
20 human to be subject
30 imaging device
31 image data
110 computer
111 CPU
112 main memory
113 storage device
114 input interface
115 display controller
116 data reader/writer
117 communication interface
118 input device
119 display device
120 recording medium
121 bus

What is claimed is:

1. A part detection apparatus comprising:
one or more memories configured to store instructions; and
one or more processors configured to execute the instructions to:
acquire image data of a human subject from an imaging device continuously at set intervals,
extract an outline representing a contour of the human subject, from the acquired image data, continuously calculates a curvature radius on the extracted outline and detect a part of a body of the human subject, for each image of the acquired image data, based on a change in the calculated curvature radius, output coordinates of each part to an analyzer connected to the part detection apparatus, specify, in the analyzer, a time series change in the coordinates in a horizontal direction and a vertical direction of each part, and determine whether the human subject walks straight based on the specified time series change.

2. The part detection apparatus according to claim 1, wherein the one or more processors is further configured to execute the instructions to identify a point on the outline where the change in curvature radius changes from decreasing to increasing and detects the identified point as a part of the part.

3. The part detection apparatus according to claim 2, wherein the one or more processors is further configured to execute the instructions to detect one of at least of a shoulder, a head, a neck, an elbow, and a knee, as the part.

4. A part detection method comprising:

acquiring image data of a human subject from an imaging device continuously at set intervals, extracting an outline representing a contour of the human subject, from the acquired image data, continuously calculating a curvature radius on the extracted outline and detecting a part of a body of the human subject, for each image of the acquired image data, based on a change in the calculated curvature radius, outputting coordinates of each part to an analyzer connected to a part detection apparatus, specifying, in the analyzer, a time series change in the coordinates in a horizontal direction and a vertical direction of each part, and determining whether the human subject walks straight based on the specified time series change.

5. The part detection method according to claim 4, wherein identifying a point on the outline where the change in curvature radius changes from decreasing to increasing and detecting the identified point as a part of the part.

6. The part detection method according to claim 5, wherein detecting one of at least of a shoulder, a head, a neck, an elbow, and a knee, as the part.

7. A non-transitory computer-readable recording medium that includes a program recorded thereon, the program including instructions that cause a computer to carry out, acquiring image data of a human subject from an imaging device continuously at set intervals, extracting an outline representing a contour of the human subject, from the acquired image data, continuously calculating a curvature radius on the extracted outline and detecting a part of a body of the human subject, for each image of the acquired image data, based on a change in the calculated curvature radius, outputting coordinates of each part to an analyzer connected to a part detection apparatus, specifying, in the analyzer, a time series change in the coordinates in a horizontal direction and a vertical direction of each part, and determining whether the human subject walks straight based on the specified time series change.

8. The non-transitory computer-readable recording medium according to claim 7, wherein identifying a point on the outline where the change in curvature radius changes from decreasing to increasing and detecting the identified point as a part of the part.

9. The non-transitory computer-readable recording medium according to claim 8, wherein detecting one of at least of a shoulder, a head, a neck, an elbow, and a knee, as the part.

\* \* \* \* \*